M. Sands,
Wash-Board,
Nº 2,456. Patented Feb. 12, 1842.
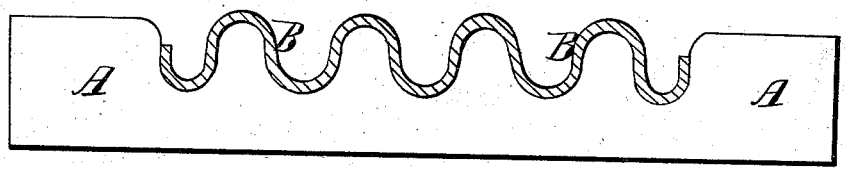

UNITED STATES PATENT OFFICE.

MARCELLUS SANDS, OF FRANKLIN, NEW YORK.

WASHBOARD FOR WASHING CLOTHES.

Specification of Letters Patent No. 2,456, dated February 12, 1842; Antedated February 7, 1842.

*To all whom it may concern:*

Be it known that I, MARCELLUS SANDS, of the town of Franklin, in the county of Delaware and State of New York, have invented a new and Improved Mode in Washing Clothes; and I do hereby declare that the following is a full and exact description.

The nature of my invention consists in having a board in the shape of the common wash-boards with one side of or a part of one side fluted and india rubber put over the fluted surface so also to form a fluted surface and fastened by nails or anything else to make it firm.

To enable others skilled in the art to make and use my invention I will proceed to describe its construction and operation. I construct my board A in any of the known shapes of the wash-boards now in use and make a fluted surface and then fasten over the fluted surface by nails or otherwise a piece of india rubber B so that there still is a fluted surface and rub the clothes as on a common washboard.

What I claim as my invention and desire to secure by Letters Patent is—

The application of the india rubber on the surface of the board to rub the clothes on using the india rubber in any shape.

MARCELLUS SANDS.

Witnesses:
THOS. D. BELL,
JARVIS HOWARD.